US008901793B2

(12) United States Patent
Bitzer

(10) Patent No.: US 8,901,793 B2
(45) Date of Patent: Dec. 2, 2014

(54) MAGNET CARRIER FOR A POLE HOUSING

(75) Inventor: Harold Bitzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 13/499,969

(22) PCT Filed: Aug. 20, 2010

(86) PCT No.: PCT/EP2010/062159
§ 371 (c)(1),
(2), (4) Date: May 2, 2012

(87) PCT Pub. No.: WO2011/045111
PCT Pub. Date: Apr. 21, 2011

(65) Prior Publication Data
US 2012/0206005 A1    Aug. 16, 2012

(30) Foreign Application Priority Data
Oct. 15, 2009  (DE) .......................... 10 2009 045 713

(51) Int. Cl.
| | |
|---|---|
| *H02K 1/18* | (2006.01) |
| *H02K 21/28* | (2006.01) |
| *H02K 1/17* | (2006.01) |
| *H02K 1/28* | (2006.01) |

(52) U.S. Cl.
CPC ...................................... *H02K 1/17* (2013.01)
USPC ................................ 310/154.17; 310/154.03

(58) Field of Classification Search
CPC ......... H02K 21/28; H02K 1/28; H02K 1/185; H02K 1/30; H02K 1/18
USPC ............. 310/154.17, 154.03, 154.14, 154.15, 310/154.18, 154.19, 156.19, 156.26, 156.12
See application file for complete search history.

(56) References Cited

U.S. PATENT DOCUMENTS 3,083,310 A  *  3/1963  Tweedy et al. ........... 310/154.18
4,542,314 A     9/1985  Corbach et al.
(Continued)

FOREIGN PATENT DOCUMENTS

| GB | 1314472   | 4/1973 | |
|---|---|---|---|
| GB | 1314472 A * | 4/1973 | ............... H02K 1/18 |

(Continued)

OTHER PUBLICATIONS

PCT/EP2010/062159 International Search Report dated Feb. 8, 2011 (Translation and Original, 4 pages).

Primary Examiner — Michael Andrews
(74) Attorney, Agent, or Firm — Michael Best & Friedrich LLP

(57) ABSTRACT

The invention relates to a magnet carrier (1) for a pole housing (10) for fastening magnets (111, 112) to a pole housing wall (101), wherein the magnet carrier (1) can be arranged between at least two magnets. The magnet carrier (1) comprises a positioning element (12, 22, 32, 42, 52) and a securing element (13, 23, 33, 43, 53). The positioning element (12, 22, 32, 42, 52) can be arranged on the pole housing wall (101). Furthermore, the positioning element (12, 22, 32, 42, 52) is designed to fix the at least two magnets (111, 112). The securing element (13, 23, 33, 43, 53) can be arranged on the pole housing wall (101) with the pole housing wall opposite of the positioning element (12, 22, 32, 42, 52). The securing element (13, 23, 33, 43, 53) is designed to be in engagement with the positioning element (12, 22, 32, 42, 52) and to thereby hold the positioning element (12, 22, 32, 42, 52) on the pole housing wall (101).

11 Claims, 6 Drawing Sheets

(56) References Cited

U.S. PATENT DOCUMENTS

| | | | | |
|---|---|---|---|---|
| 4,973,871 | A | * 11/1990 | Bisantz | 310/154.17 |
| 7,679,250 | B2 | 3/2010 | De Godoy et al. | |
| 8,353,544 | B2 | 1/2013 | Fiedler | |
| 2002/0050757 | A1 | * 5/2002 | Kako et al. | 310/154.14 |
| 2009/0251022 | A1 | * 10/2009 | Iversen et al. | 310/156.12 |

FOREIGN PATENT DOCUMENTS

| | | |
|---|---|---|
| JP | 47000008 | 6/1970 |
| JP | 62-129281 | 8/1987 |
| WO | 9638900 | 12/1996 |

\* cited by examiner

MAGNET CARRIER FOR A POLE HOUSING

BACKGROUND OF THE INVENTION

The invention relates to a magnet carrier for a pole housing for attaching magnets to a pole housing wall, wherein the magnet carrier can be arranged between at least two magnets.

A pole housing having a magnet carrier is preferably employed in a DC motor. In this case, a distinction is made between two- to four-pole DC motors and DC motors with four or more poles. In the case of two- to four-pole DC motors, the magnet gaps are generally so large that a leaf spring can be placed in the magnet gaps. As an alternative, a clip spring can also be used. The leaf spring is connected to the pole housing by means of solid or hollow rivets for attachment purposes. However, magnet gaps of less than 5 to 6 mm cannot be realized with the leaf spring or else with the clip spring.

In the case of DC motors with four or more poles, a gap which is as small as possible is formed between the magnets for the purpose of optimizing the degree of efficiency, wherein the magnets are adhesively bonded to one another. However, this method is time-consuming and costly since an adhesive bonding station is required for production. This is not economical, primarily in the case of relatively low numbers of units.

SUMMARY OF THE INVENTION

The object of the invention is to fit a magnet using low-cost components and with a low level of investment in fitting devices while maintaining extremely small magnet gaps.

The invention discloses a magnet carrier for a pole housing for attaching magnets. The magnet carrier comprises a positioning element and a securing element, wherein the positioning element can be arranged on the pole housing wall. Furthermore, the positioning element is designed to fix the at least two magnets. The securing element can be arranged on the pole housing wall which is situated opposite the pole housing wall which has the positioning element. In this case, the securing element is designed to engage with the positioning element and thus to firmly hold the positioning element on the pole housing wall.

One advantage of the magnet carrier according to the invention is that the positioning element and the securing element can be produced in a cost-effective manner. Furthermore, the positioning element and the securing element can be assembled in a simple manner, and therefore material costs can be saved even in the case of relatively low numbers of units.

In one embodiment of the invention, the securing element is of sprung design in order to compensate for settling phenomena of the magnet carrier. This provides permanent pretensioning of the magnets over the service life of the product.

In a further embodiment of the invention, the positioning element has a crosspiece with an attachment element for fixing the at least two magnets. The at least two magnets can be fixed axially in the pole housing with the aid of the attachment element on the positioning element.

According to a further embodiment of the invention, the positioning element is of V-shaped and elastic design. On account of the V shape of the positioning element, magnet gaps of different sizes can also be filled and uniform distribution of the magnets can be ensured. Furthermore, permanent pretensioning of the magnets over the service life of the product can be ensured.

In a further embodiment of the invention, the positioning element has lateral projections which each have an engagement element, wherein an elastic clip can be arranged as a securing element in and/or on the engagement element. The engagement element is preferably in the form of a latching lug and/or a stop. As a result, the securing element can be fixed both axially and also radially to the positioning element. On account of the latching lugs and/or stops, the positioning element and the securing element can securely and firmly hold the magnets even under high shaking loads.

According to a further embodiment of the invention, the positioning element has a central projection with an engagement element for attaching a speednut as the securing element. As a result, the securing element can be mounted and fixed on the positioning element in a simple manner.

In a further embodiment of the invention, the positioning element has a central projection with an insertion hole for fixing a shaft as the securing element. The securing element can be supplied tangentially by virtue of the insertion hole in the central projection, and therefore simple assembly can be ensured.

Furthermore, according to a further embodiment of the invention, the securing element is firmly arranged at at least one end of the positioning element, and therefore the magnet carrier is of integral design. A flat spring is preferably embedded in the positioning element in order to ensure pretensioning of the magnets over the service life of the product. Furthermore, the positioning element can be arranged axially between the magnets.

BRIEF DESCRIPTION OF THE DRAWINGS

The invention will be explained in greater detail in the text which follows using exemplary embodiments with reference to the appended drawings, in which.

DETAILED DESCRIPTION

Figure 1A:
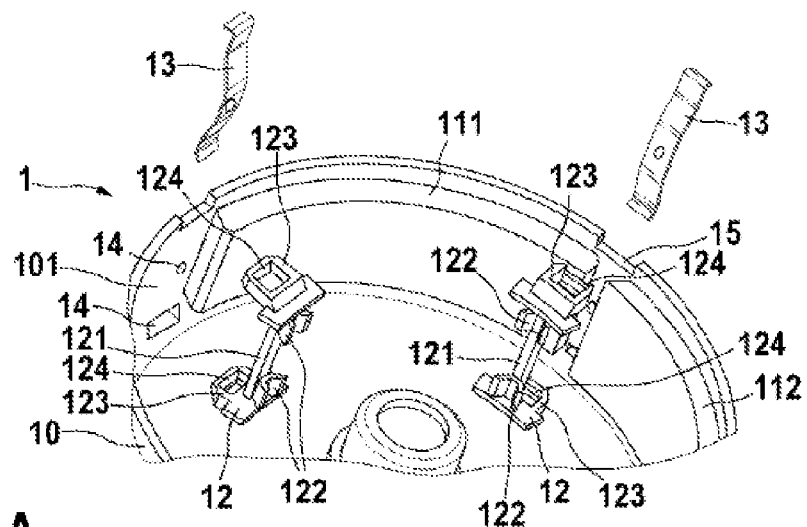
FIGS. 1A and 1B show a schematic illustration of a magnet carrier according to a first embodiment.

The embodiments of FIGS. 1 to 5 show a magnet carrier 1 for a pole housing 10 for attaching magnets 111, 112 to a pole housing wall 101. The magnet carrier 1 is preferably formed from plastic. As an alternative, any other material which is suitable as a magnet carrier 1 in a pole housing 10 can be used. The magnet carrier 1 can be arranged in the pole housing 10 between at least two magnets 111, 112. The pole housing 10 is preferably used in a DC motor with four or more poles. A gap between the magnets which is as small as possible is required in the case of DC motors with four or more poles for the purpose of optimizing the degree of efficiency. In order to facilitate attachment of the magnets 111, 112, the magnet carrier 1 comprises a positioning element 12, 22, 32, 42, 52 and a securing element 13, 23, 33, 43, 53.

The positioning element 12, 22, 32, 42, 52 can be arranged on the pole housing wall 101. In this case, the positioning element 12, 22, 32, 42, 52 has a crosspiece 121, 221, 321, 421, 421, 521 with an attachment element 122, 222, 322, 422, 522 for fixing the at least two magnets 111, 112. The crosspiece 121, 221, 321, 421, 521 of the positioning element 12, 22, 32, 42, 52 can be designed in two ways. In a first embodiment, the crosspiece 121, 221, 321, 421 has at least two attachment elements 122, 222, 322, 422 which are arranged at the ends of the crosspiece 121, 221, 321, 421. In this case, the at least two attachment elements 122, 222, 322, 422 are of V-shaped design and have elastic properties. As a result, the magnets 111, 112 can be axially fixed in the pole housing 10. Furthermore, the magnets 111, 112 are pressed radially against the pole housing wall 101 by the V-shaped attachment elements 122, 222, 322, 422. The V-shaped design allows different magnet gaps to be filled, with uniform distribution of the magnets 111, 112 being ensured. In this case, the surface of the crosspiece 121, 221, 321, 421 can be smooth or have ribs. The crosspiece 121, 221, 321, 421 of the positioning element 12, 22, 32, 42 is of elastic design, and therefore the magnets 111, 112 are pretensioned.

In a second embodiment, the attachment element 522 is arranged along the entire crosspiece 521. In this case, the attachment element 522 is of V-shaped and elastic design in order to ensure pretensioning and uniform distribution of the magnets 111, 112. For the purpose of axial protection, a snap-action hook 56 engages around the pole housing 10 and latches into two outwardly projecting formations of the pole housing 10. The snap-action hook 56 is arranged between the attachment element 522 in this case. The snap-action hook 56 is of elastic design, like the attachment element 522, and therefore a contact pressure is exerted on the magnets 111, 112 via the attachment elements 520 of V-shaped design on the opposite pole housing wall 102. In order to compensate for the axial tolerance of the magnets 111, 112, the axial stops for the magnets 111, 112 are likewise of elastic design. For tangential tolerance compensation, that is to say to compensate for different gaps between the magnets 111, 112, the attachment element 522 is arranged slightly conically in the lower region of the positioning element 52.

The securing element 13, 23, 33, 43, 53 can be arranged on that pole housing wall 102 which is situated opposite the pole housing wall 101 having the positioning element 12, 22, 32, 42, 52. The securing element 13, 23, 33, 43, 53 is preferably designed to engage with the positioning element 12, 22, 32, 42, 52 and thus to firmly hold the positioning element 12, 22, 32, 42, 52 on the pole housing wall 101. Furthermore, the securing element 13, 23, 33, 43, 53 is of sprung design. The positioning element 12, 22, 32, 42, 52 and the securing element 13, 23, 33, 43, 53 can ensure simple production of the magnet carrier 1, and therefore said magnet carrier can be produced in a cost-effective manner even in the case of relatively low numbers of units.

Figure 1B:
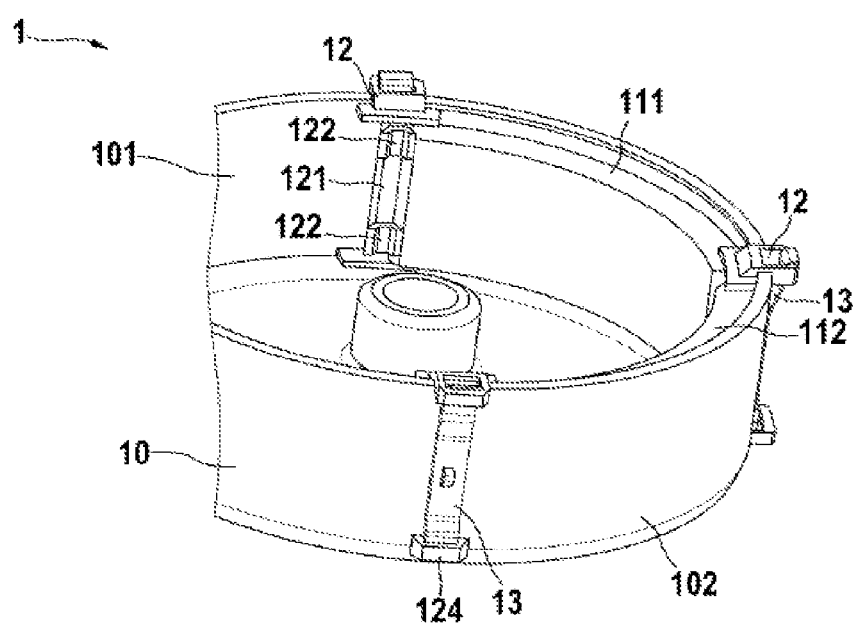

FIG. 1A shows a first embodiment of the magnet carrier 1 in a state in which it is not fitted and FIG. 1B shows said magnet carrier in a state in which it is fitted. In this case, the positioning element 12 has, at the ends, lateral projections 123 having an engagement element 124 in each case. The lateral projection 123 at the end of the positioning element 12 is of rectangular design in this case and has an opening in the center. As a result, the engagement element 124 is preferably in the form of a latching lug and/or a stop in order to securely hold the magnets 111, 112 even under shaking loads. An elastic clip can be arranged as the securing element 13 in the engagement element 124 on the lateral projections 123. The clip is axially fixed in the engagement element 124 and can be in the form of a flexible spring in this case. In order to attach the clip, the positioning element 12 projects through an opening 14 and a notch 15 in the pole housing wall 101, 102. In this case, the opening 14 is of rectangular design in the lower region of the pole housing wall 101, 102. Furthermore, the opening 14 has a round shape in the center of the pole housing wall 101, 102. The notch 15 is U-shaped in the upper region of the pole housing wall 101, 102. The opening 14 and the notch 15 allow the positioning element 12 to be attached to the pole housing wall 101, 102 in a simple manner.

Figure 2A:
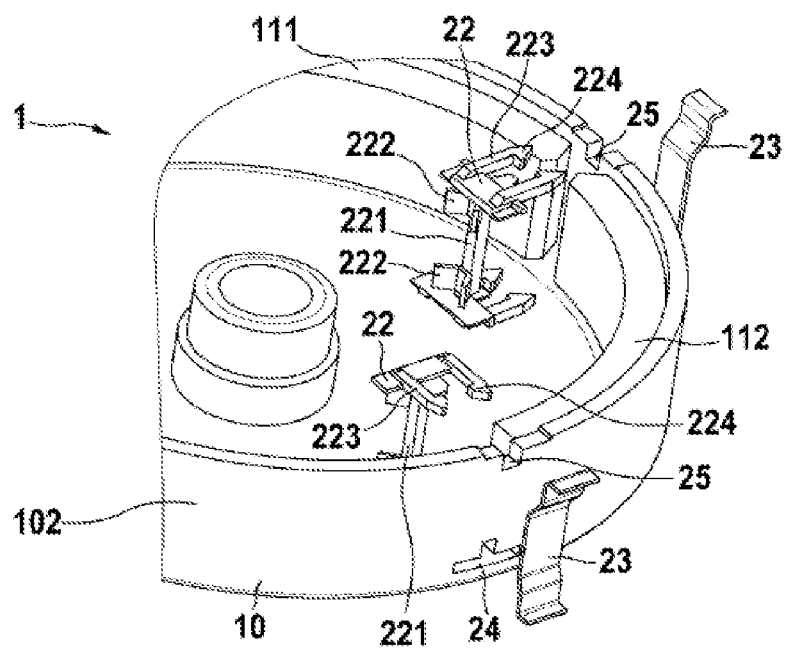
FIGS. 2A and 2B show a schematic illustration of the magnet carrier according to a second embodiment.
Figure 2B:
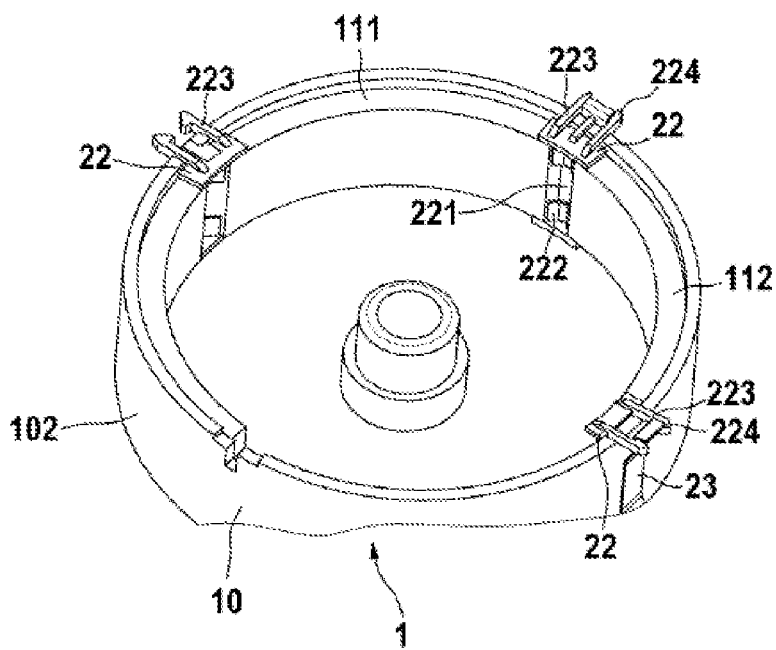

FIG. 2A shows a second embodiment of the magnet carrier 1 in a state in which it is not fitted and FIG. 2B shows said magnet carrier in a state in which it is fitted. In this case, the positioning element 22 has, at the ends, lateral projections 223 having an engagement element 224 in each case. The lateral projection 223 at the ends of the positioning element 22 is of U-shaped design, wherein the engagement element 224 is in the form of a latching lug on the lateral projection 223. An elastic clip can be radially arranged as the securing element 23 on the engagement element 124. This allows the positioning element 22 and the securing element 23 to be assembled in a simple manner. An opening 24 and a notch 25 are formed as T-shaped convex portions in the upper and in the lower region of the pole housing wall 101, 102. As a result, the opening 24 and the notch 25 can interact with the projections 223 on the positioning element 22. Furthermore, the opening 24 and the notch 25 allow the positioning element 22 to be attached to the securing element 23 in a simple manner.

Figure 3A:
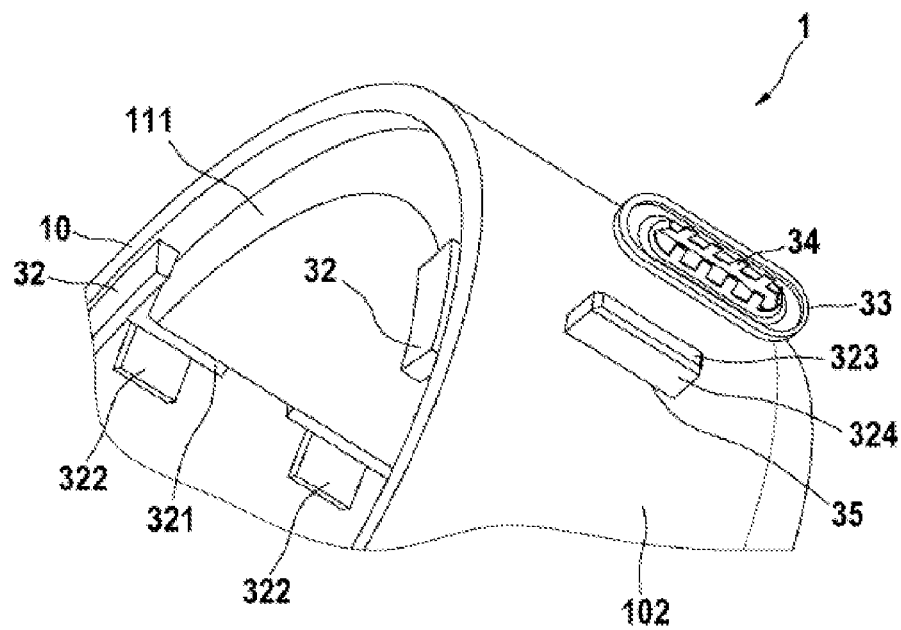
FIGS. 3A and 3B show a schematic illustration of the magnet carrier according to a third embodiment.
Figure 3B:
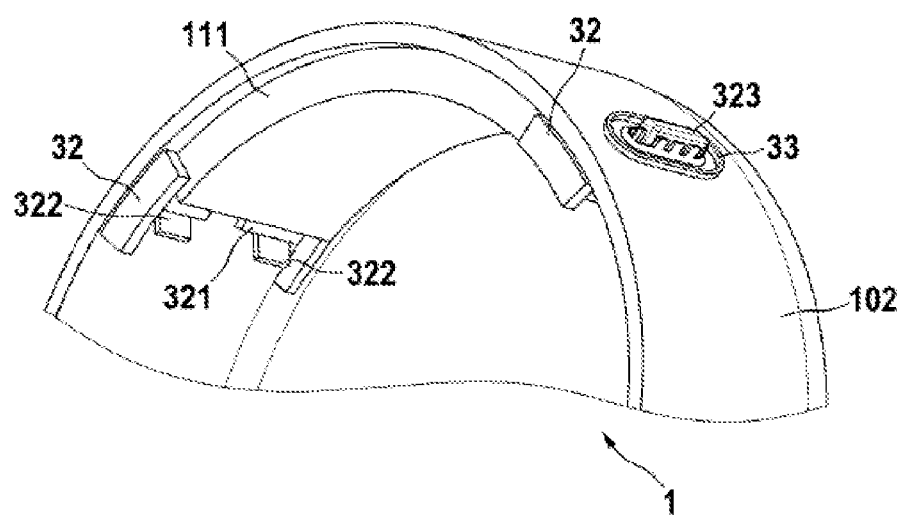

FIG. 3A shows a third embodiment of the magnet carrier 1 in a state in which it is not fitted and FIG. 2B shows said magnet carrier in a state in which it is fitted. The positioning element 32 has a central projection 323 with an engagement element 324 for attaching a speednut as the securing element 33. The central projection 323 on the positioning element 32 is of rectangular design in this case, and therefore the central projection 323 interacts with an opening 35 in the pole housing wall 101, 102. In this case, the positioning element 32 is routed through the opening 35 in the pole housing wall 101, 102 and attached to the speednut. In this case, the speednut has an oval shape. Lugs 34 are preferably provided in the center of the speednut in order to fix the speednut to the engagement element 324 in a simple and reliable manner.

Figure 4A:
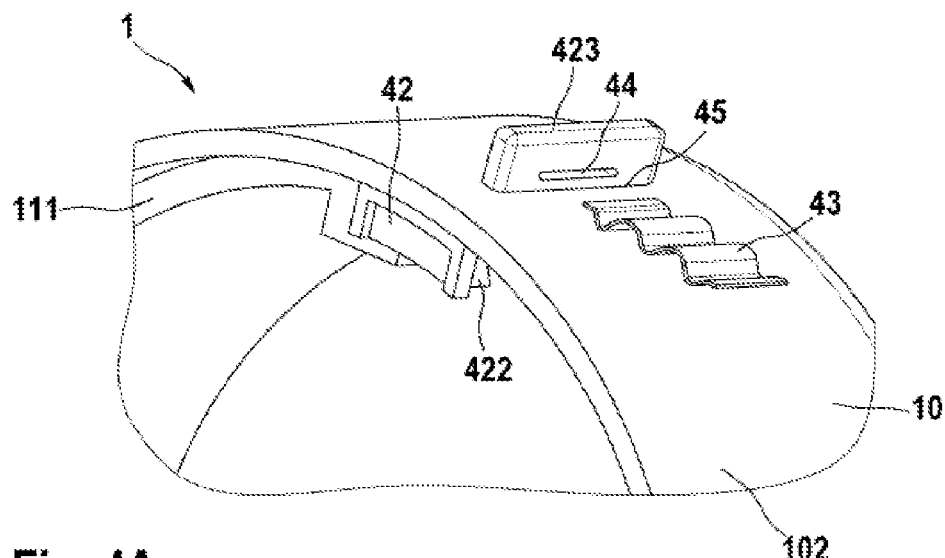
FIGS. 4A and 4B show a schematic illustration of the magnet carrier according to a fourth embodiment.
Figure 4B:
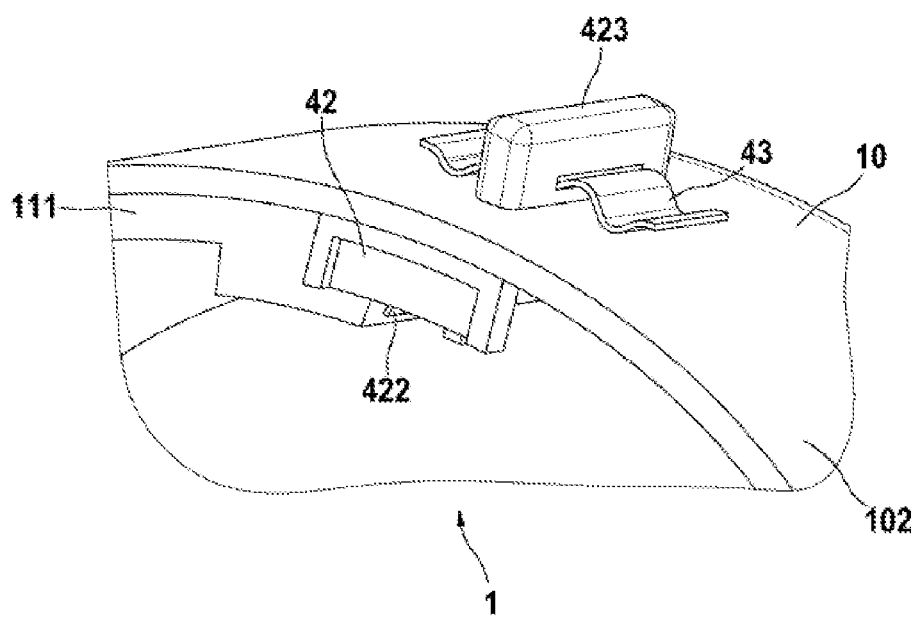

FIG. 4A shows a fourth embodiment of the magnet carrier 1 in a state in which it is not fitted and FIG. 4B shows said magnet carrier in a state in which it is fitted. The positioning element 42 has a central projection 423 with an insertion hole 44. In this case, the central projection 423 is of rectangular design, wherein the insertion hole 44 is formed in the region of the crosspiece 421. The insertion hole 44 has a rectangular shape like the central projection 423. The insertion hole 44 in the positioning element 42 interacts with an opening 45 in the pole housing wall 101, 102. A shaft can then be fixed in the insertion hole 44 as the securing element 43. The shaft or the shaft spring is tangentially attached in the insertion hole 44. As a result, the positioning element 42 can be assembled with the securing element 43 in a simple manner.

In the embodiments described above, the positioning element 12, 22, 32, 42 is always routed radially from the inside to the outside through the pole housing wall 101 and is secured or radially braced by means of a securing element 13, 23, 33, 43. In the further embodiment, the magnet carrier 1 is axially supplied. In this case, the magnet carrier 1 is in the form of a spacer with an X-shaped interior, while the magnet carrier 1 is L-shaped on the outside and surrounds the pole housing 10.

Figure 5A:
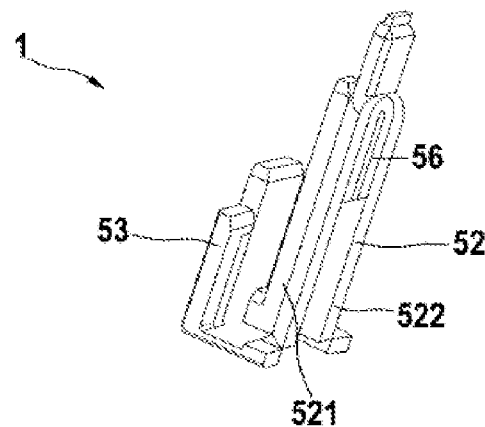
FIGS. 5A and 5B show a schematic illustration of the magnet carrier according to a fifth embodiment.
Figure 5B:
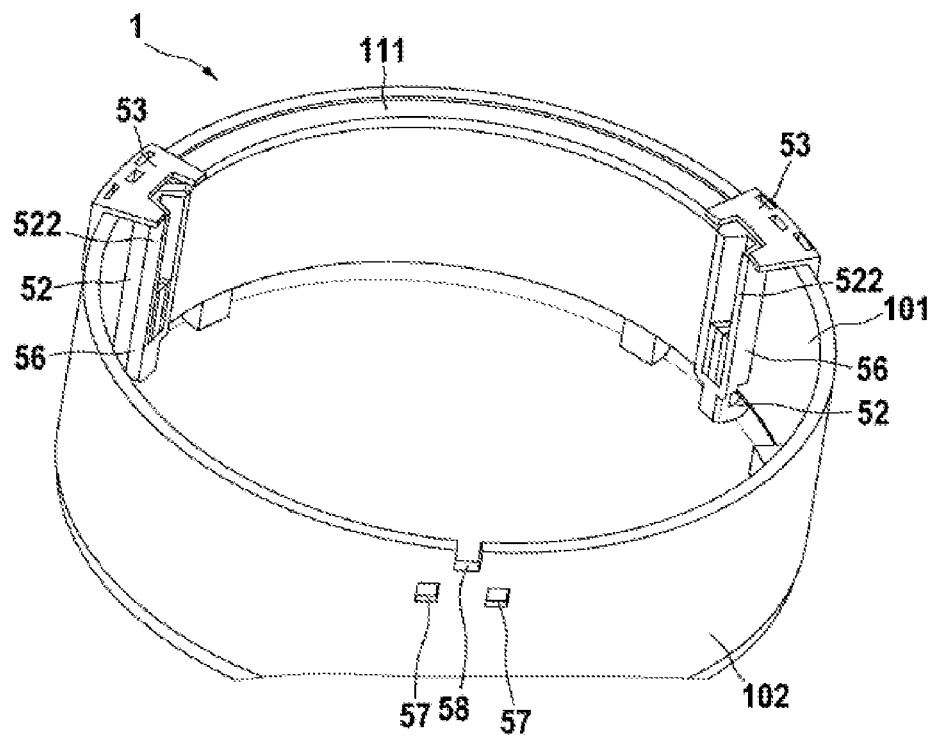
Figure 6:
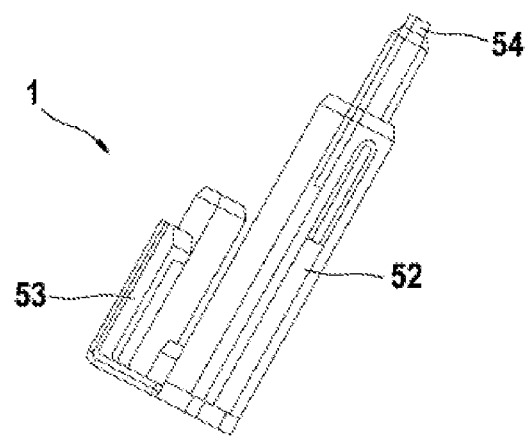
FIG. 6 shows a positioning element having an embedded flat spring.
Figure 7:
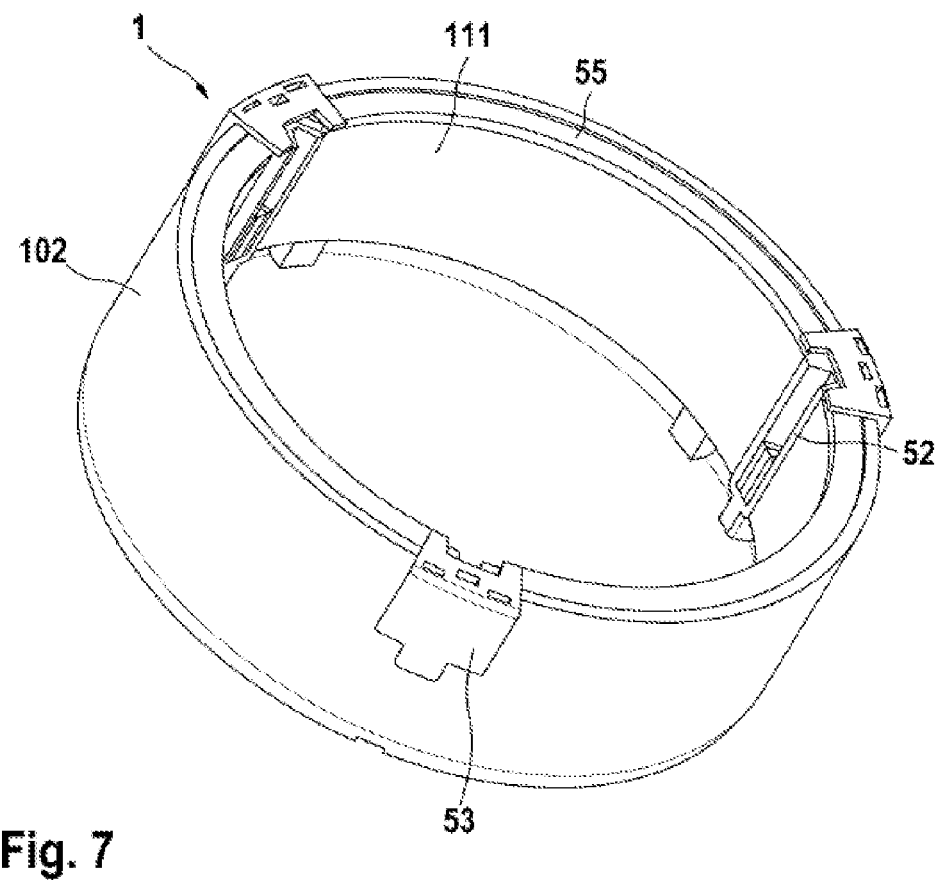
FIG. 7 shows a ring on which the magnet carrier is arranged.

FIG. 5A shows a fifth embodiment of the magnet carrier 1 in a state in which it is not fitted and FIG. 5B shows said magnet carrier in a state in which it is fitted. Since the magnet carrier 1 is axially supplied, the positioning element 52 and the securing element 53 can be integrally formed. In this case, the securing element 53 is firmly arranged at at least one end of the positioning element 52. In order to axially fix the magnet carrier 1 to the pole housing wall 101, 102, the pole housing 10 has two convex portions 57 and a notch 58 in the upper region. Furthermore, the positioning element 52 has a bending bar which deforms after being inserted into an opening in the pole housing base and, as a result, ensures permanent pretensioning of the magnets 111, 112. Since the magnet carrier 1 always relaxes as a result of temperature fluctuations over the service life and there is therefore the risk of sufficient pretensioning of the magnets 111, 112 being lost, a flat spring 54, as shown in FIG. 6, can be arranged in the crosspiece 521 of the positioning element 52. Furthermore, the elasticity in the positioning element 52 can be improved by virtue of the flat spring 54.

The magnets 111, 112 can be attached by means of individual segments. Furthermore, it is possible to integrate the magnet carrier 1 directly on a ring 55. The ring 55 can be used for all the embodiments of the magnet carrier 1. Simple assembly can be ensured by the use of the ring 55. However, there is the risk of the ring 55 warping to a relatively great extent and this creating problems in respect of fitting.

The invention relates, in particular, to a magnet carrier 1 having a positioning element 12, 22, 32, 42, 52 and a securing element 13, 23, 33, 43, 53. The critical features here are that the positioning element 12, 22, 32, 42, 53 can be arranged on the pole housing wall 101 and is designed to fix the at least two magnets 111, 112. The securing element 13, 23, 33, 43 can be arranged on that pole housing wall 102 which is situated opposite the pole housing wall 102 having the positioning element 12, 22, 32, 42, 52 and is designed to engage with the positioning element 12, 22, 32, 42, 52 and thus to firmly hold the positioning element 12, 22, 32, 42, 52 on the pole housing wall 101. Costs can be saved during production by virtue of the positioning element 12, 22, 32, 42, 52 and the securing element 13, 23, 33, 43, 53. Furthermore, the positioning element 12, 22, 32, 42, 52 and the securing element 13, 23, 33, 43, 53 can be assembled in a simple manner, and therefore material costs can be saved even in the case of relatively low numbers of units.

What is claimed is:

1. A magnet carrier for a pole housing (10) for attaching magnets (111, 112) to an interior pole housing wall (101), wherein the magnet carrier (1) can be arranged between at least two magnets (111, 112), characterized in that the magnet carrier (1) comprises a positioning element (12, 22, 32 42, 52) and a securing element (13, 23, 33, 43, 53), wherein the positioning element (12, 22, 32 42, 52) can be arranged on the interior pole housing wall (101) and is designed to fix the at least two magnets (111, 112), and wherein the securing element (13, 23, 33, 43, 53) can be arranged on an exterior pole housing wall (102) which is situated opposite the interior pole housing wall (101) having the positioning element (12, 22, 32, 42, 52) and is designed to engage with the positioning element (12, 22, 32, 42, 52) and to firmly hold the positioning element (12, 22, 32, 42, 52) on the interior pole housing wall (101), characterized in that the positioning element (12, 22, 32, 42, 52) has at least one lateral projection (123, 223) which has an engagement element (124, 224) disposed radially exterior of the exterior pole housing wall (102) for engagement with the securing element (13, 23, 33, 43, 53).

2. The magnet carrier as claimed in claim 1, characterized in that the securing element (13, 23, 33, 43, 53) is of sprung design.

3. The magnet carrier as claimed in claim 1, characterized in that the positioning element (12, 22, 32, 42, 52) has a crosspiece (121, 221, 321, 421, 521) with an attachment element (122, 222, 322, 422, 522) for fixing the at least two magnets (111, 112).

4. The magnet carrier as claimed in claim 1, characterized in that the positioning element (12, 22, 32, 42, 52) is of V-shaped and elastic design.

5. The magnet carrier as claimed in claim 1, characterized in that the positioning element (12, 22, 32, 42, 52) is attached to a ring (55).

6. The magnet carrier as claimed in claim 1, characterized in that the engagement element (124, 224) is a latching lug.

7. The magnet carrier as claimed in claim 1, characterized in that the positioning element (32) has a central projection (323) with an engagement element (324) for attaching a speednut as the securing element (33).

8. The magnet carrier as claimed in claim 1, characterized in that the positioning element (42) has a central projection (423) with an insertion hole (44) for fixing a shaft as the securing element (43).

9. The magnet carrier as claimed in claim 1, characterized in that the securing element (53) is arranged at at least one end of the positioning element (52).

10. The magnet carrier as claimed in claim 9, characterized in that a flat spring (54) is embedded in the positioning element (52).

11. The magnet carrier as claimed in claim 1, wherein the securing element (13, 23) is an elastic clip.

* * * * *